United States Patent
Shannon

[11] Patent Number: 6,088,678
[45] Date of Patent: Jul. 11, 2000

[54] PROCESS SIMULATION TECHNIQUE USING BENEFIT-TRADE MATRICES TO ESTIMATE SCHEDULE, COST, AND RISK

[75] Inventor: Diane M. Shannon, Westchester, Calif.

[73] Assignee: Raytheon Company, Lexington, Mass.

[21] Appl. No.: 08/629,666

[22] Filed: Apr. 9, 1996

[51] Int. Cl.[7] ............................. G06F 15/00; G06F 15/46; G06F 17/60
[52] U.S. Cl. ........................................ 705/8; 705/7; 705/9
[58] Field of Search ........................................ 705/8, 7, 9

[56] References Cited

U.S. PATENT DOCUMENTS

| | | | |
|---|---|---|---|
| 5,233,533 | 8/1993 | Edstrom et al. | 364/486 |
| 5,692,125 | 11/1997 | Schloss et al. | 395/209 |
| 5,737,728 | 4/1998 | Sisley et al. | 705/8 |

OTHER PUBLICATIONS

Frame, J. Davidson, "The New Project Management", Jossey–Bass Publishers, pp. 85–94, 1994.
Frame, J. Davidson, "Management Projects in Organizations", Jossey–Bass Publishers, pp. 171–183, 1995.
Frame, J. Davidson, "The New Project Management", Jossey–Bass Publishers, p. 38 and 203–207, 1994.
Kanof P., "Una applicazione di Manutenzione studiata con gli utenti". Sistemi e Automazione, No. 145, Milan, Italy. (and English translation), Jan. 1975.

*Primary Examiner*—Allen R. MacDonald
*Assistant Examiner*—Pedro Kanof
*Attorney, Agent, or Firm*—Leonard A. Alkov; William C. Schubert; Glenn H. Lenzen, Jr.

[57] ABSTRACT

A computer-implemented process simulation method or tool that uses a software engine that calculates resources required to complete a project based upon contents of user-defined benefit-trade matrices associated with substeps of the project and design requirement priority values and a sample design whose process is to be simulated. Design requirement priority values and the sample design are input. Each substep is defined using a benefit-trade matrix that comprises a multiple variable lookup table that embodies history data relating to the substep. Each matrix includes relative weights of schedule, cost and risk elements for the substep and user-input rating values corresponding to the importance of each element. A logical equation is defined for each substep that computes the time required to complete the project, required resources for the project, and cost of the project based upon data input thereto. Weights for schedule, cost and risk elements of each benefit-trade matrix, and rating values for schedule, cost and risk elements of each benefit-trade matrix are input by a user. Output vectors for each benefit-trade matrix that comprise values corresponding to the respective weight of each element times the respective rating value of each element are computed. At each substep, resources required to complete the project are calculated using the vector derived from the benefit-trade matrix associated with the substep, and the design requirement priority values and predefined elements or vector derived from the benefit-trade matrix associated with a previous substep.

2 Claims, 3 Drawing Sheets

FIG. 3

31 — INPUTTING A PLURALITY OF DESIGN REQUIREMENT PRIORITY VALUES AND A SAMPLE DESIGN HAVING PREDEFINED ELEMENTS, WHICH SAMPLE DESIGN HAS A PROCESS THAT IS TO BE SIMULATED

32 — DEFINING EACH SUBSTEP OF THE PROJECT USING A PREDETERMINED BENEFIT-TRADE MATRIX THAT COMPRISES A MULTIPLE VARIABLE LOOKUP TABLE THAT EMBODIES HISTORY DATA RELATING TO THE SUBSTEP THAT IS INDICATIVE OF WEIGHTS OF SCHEDULE, COST AND RISK ELEMENTS FOR THE SUBSTEP AND USER-INPUT RATING DATA THAT COMPRISES VALUES CORRESPONDING TO THE IMPORTANCE OF EACH RESPECTIVE ELEMENT

33 — DEFINING A LOGICAL EQUATION FOR EACH SUBSTEP THAT COMPUTES THE TIME REQUIRED TO COMPLETE THE PROJECT, REQUIRED RESOURCES FOR THE PROJECT, AND COST OF THE PROJECT BASED UPON DATA INPUT THERETO

34 — INPUTTING WEIGHTS FOR SCHEDULE, COST AND RISK ELEMENTS OF EACH BENEFIT-TRADE MATRIX

35 — INPUTTING RATING VALUES FOR SCHEDULE, COST AND RISK ELEMENTS OF EACH BENEFIT-TRADE MATRIX

36 — COMPUTING OUTPUT VECTORS FOR EACH BENEFIT-TRADE MATRIX THAT COMPRISE VALUES CORRESPONDING TO THE RESPECTIVE WEIGHT OF EACH ELEMENT TIMES THE RESPECTIVE RATING VALUE OF EACH ELEMENT

37 — AT EACH SUBSTEP, CALCULATING RESOURCES REQUIRED TO COMPLETE THE PROJECT USING THE VECTOR DERIVED FROM THE BENEFIT-TRADE MATRIX ASSOCIATED WITH THE SUBSTEP, AND THE DESIGN REQUIREMENT PRIORITY VALUES AND PREDEFINED ELEMENTS OR VECTOR DERIVED FROM THE BENEFIT-TRADE MATRIX ASSOCIATED WITH THE PREVIOUS SUBSTEP

PROCESS SIMULATION TECHNIQUE USING BENEFIT-TRADE MATRICES TO ESTIMATE SCHEDULE, COST, AND RISK

BACKGROUND

The present invention generally relates to process simulation techniques, and more particularly, to a process simulation technique that uses benefit-trade matrices to dynamically predict schedule, cost and risk variables of a project.

One conventional process simulation tool made by Perceptronics, but no longer available, is known as a Computer Aided Concurrent Engineering/Project Management (CACE/PM) tool. This tool has a computer "engine" that processes user-entered requirement information including resources required for a project, such as people, tools, and machines, and user-input estimates of times required for individual substeps or tasks of the project, and predicts or calculates the time required to complete the project. The tool computes a series of time delays at each substep and outputs the time required to complete the project based upon the requirements and available resources. In the event that it is determined that there are not enough resources available to complete the project at a particular substep, the simulation stops until changes are made to the either the requirements, the resources, or the time allocated to perform the substeps that permit complete calculation of the time duration of the project.

Changing various user-defined inputs produces changes in the overall time duration of a project. The Perceptronics tool only passes a single time value from one calculation to the next, and does not permit passing of variables from one process step to the next to allow for the capture and calculation of needed schedule, cost, and risk information. In addition, neither the Perceptronics tool or any other known tool, permit variables (derived from benefit-trade matrices) to be updated during process simulation such that the simulation continues from the point of interruption, while not affecting any data collected prior to the point of interruption.

Presently available process simulation tools, such as the Perceptronics process simulation tool, may input estimated schedule, cost, and risk information at the start of a simulation, but this information is not updated during the simulation. Furthermore, there are no known simulation tools that provide data indicative of the risks associated with updates made during the simulation. In addition, there are currently no known process simulation techniques or tools that use benefit-trade matrices during process simulation.

Therefore, it is an objective of the present invention to provide for a process simulation technique or tool that uses benefit-trade matrices to dynamically predict schedule, cost and risk variables of a project. It is a further objective of the present invention to provide for a process simulation technique or tool that permits passing of variables from one process step to the next to allow for the capture and calculation of schedule, cost, and risk information affected thereby. It is a further objective of the present invention to provide for a process simulation technique or tool that permits variables derived from benefit-trade matrices to be updated during process simulation such that the simulation continues from the point of interruption, while not affecting any data collected prior to the point of interruption.

SUMMARY OF THE INVENTION

To meet the above and other objectives, the present invention provides for an improved computer-implemented process simulation method or tool that uses a software engine that calculates resources required to complete a project based upon contents of user-defined benefit-trade matrices associated with substeps of the project and design requirement priority values and a sample design whose process is to be simulated. The present method comprises the following steps.

A plurality of design requirement priority values and a sample design having predefined elements are input, which sample design has a process that is to be simulated are entered or input. Each substep of the project is defined using a predetermined benefit-trade matrix that comprises a multiple variable lookup table that embodies history data relating to the substep that includes relative weights of schedule, cost and risk elements for the substep and user-input rating data having values corresponding to the importance of each respective element. A logical equation is defined for each substep that computes the time required to complete the project, required resources for the project, and cost of the project based upon data input thereto.

Weights for schedule, cost and risk elements of each benefit-trade matrix are input by the user. Rating values for schedule, cost and risk elements of each benefit-trade matrix are input by the user. Output vectors for each benefit-trade matrix that comprise values corresponding to the respective weight of each element times the respective rating value of each element are computed. Then, at each substep, resources required to complete the project are calculated using the vector derived from the benefit-trade matrix associated with the substep, and the design requirement priority values and predefined elements or vector derived from the benefit-trade matrix associated with a previous substep.

More specifically, the Perceptronics process simulation tool was modified to allow passing of variables from one process step to the next to permit capture and calculation of schedule, cost, and risk information. The present invention allows accurate estimation of schedule, cost, and risk for programs with the benefit of understanding those risks in a quantitative way. The present invention allows variables (derived from the benefit-trade matrices) to be updated during process simulation while the simulation continues from the point of interruption without affecting any data collected prior to the point of interruption.

The present process simulation technique more accurately determines schedule, cost, and risk for projects whose processes are simulated. The present simulation technique uses data indicative of information that can be quantified and captured in benefit-trade matrices during the simulation of the actual process which results in more accurate schedule, cost, and risk information.

The present invention provides for a technique for simulating a process that incorporates benefit-trade matrices into process steps to gain knowledge of final schedule, cost, and risk for the project. The information from benefit-trade matrices associated with each task or substep of the project is transferred from one process step to the next, which allows schedule, cost, and risk data to be calculated at each step. Once the process has been completely simulated, total schedule, cost, and risk information, as well as totals from each process step, are known.

The present process simulation technique allows a program manager to accurately determine schedule, cost, and risk for a project based on the project's process definition and information provided in the benefit-trade matrices. The information in the benefit-trade matrices can be changed at any time (i.e., scenario modification) to look at the impact of those changes. In addition, the simulation can be paused at any time during the process, the benefit-trade matrices variables changed, and the impact of those changes seen for the remainder of tasks for the project.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a flow diagram detailing the method implemented by present invention.

DETAILED DESCRIPTION

Figure 1:
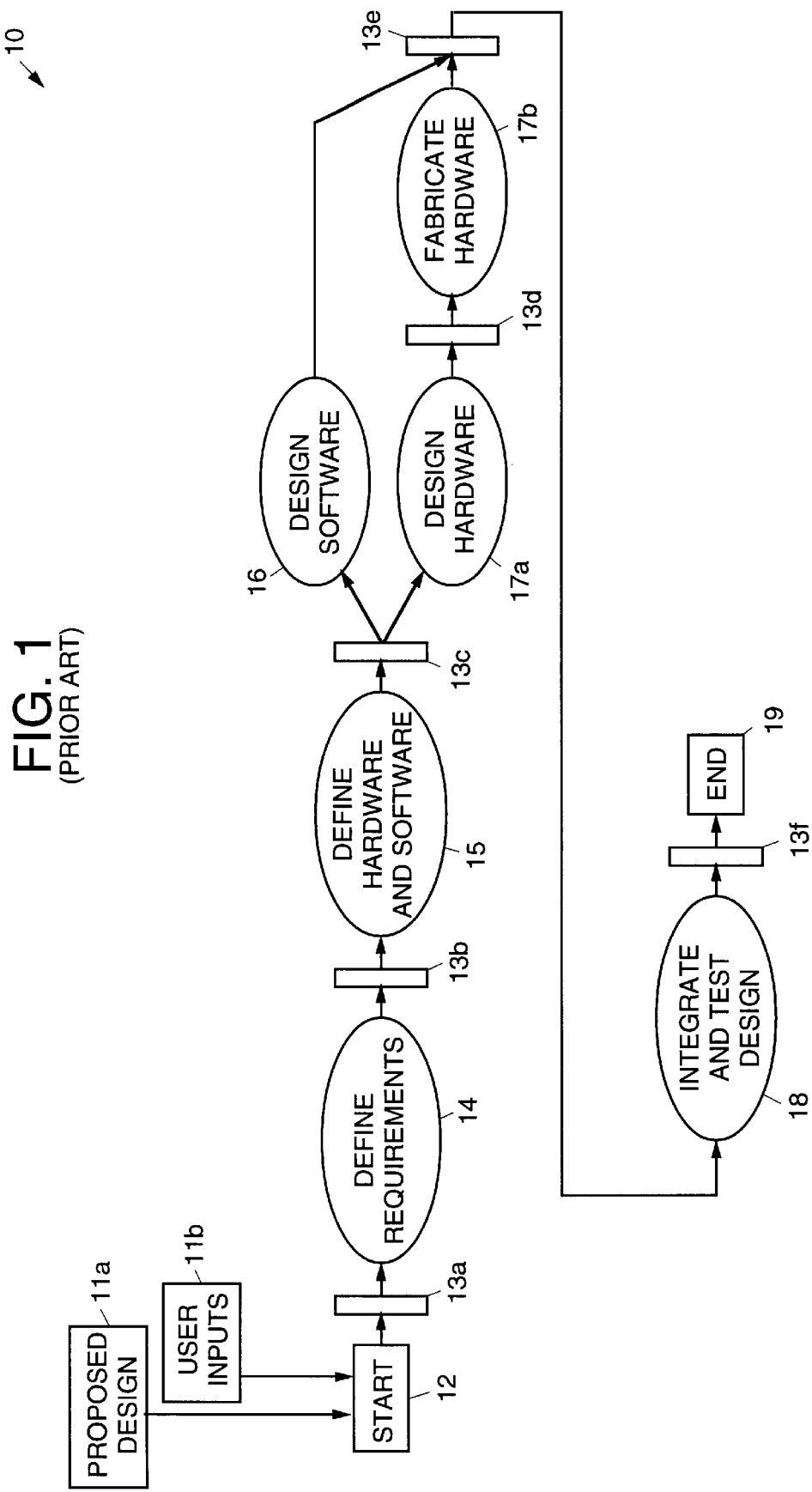
FIG. 1 is a process flow diagram illustrating a conventional process simulation tool that is improved upon by the present invention

Referring now to the drawing figures, FIG. 1 is a process flow diagram illustrating a conventional process simulation tool 10 that is improved upon by the present invention. A representative conventional process simulation tool 10 is a Perceptronics process simulation tool 10 known as the Perceptronics Computer Aided Concurrent Engineering/Project Management (CACE/PM) tool 10 which has been modified to implement the present invention. The present invention will be described in terms of simulating a process for designing, building and testing a system that has hardware and software components, such as is required to build a computer system, for example.

Referring to FIG. 1, the Perceptronics tool 10 allows a user to input a proposed design 11a for the system whose process is to be simulated, which includes such things as the number of circuit cards to be designed and built, the number of custom circuits that are required, the number of software modules that are required, and so forth. The operation of conventional process simulation tools 10, such as the Perceptronics tool 10, along with the design and user inputs that are used in a simulation, are well known in the art and will not be discussed in detail herein.

The process for the proposed design 11a is simulated by defining a series of cells that represent each of the tasks or substeps in the process. These tasks or substeps are shown as including a define requirements substep 14, a define hardware and software substep 15, a design software substep 16, a design hardware substep 17a, a fabricate hardware substep 17b, and an integrate and test design substep 18.

It is to be understood that the process that is depicted in FIG. 1 is representative of a simple system whose process is to be simulated and that this process has been simplified to permit easy understanding of the prior art and the improvements of the present invention. In general, the processes that are typically simulated are very complex, although the conventional simulation tools 10 and the present invention may be used to simulate simple or complex processes.

In the conventional simulation tool 10, a proposed design 11a and the user inputs 11b are entered, and each of the cells are configured with data entered by the user. This data includes the estimated time to complete the particular substep, a deviation from that estimated time, and the unit of time, along with resources that are required to complete the substep, including people, tools and machines. Data for each of the substeps is then entered and the simulation is started 12. A series of events 13a–13f are provided for the purpose of pausing and evaluating the results of the simulation at each point in time.

The tool 10 then runs the simulation by predicting or calculating the time required to complete the entire project. The tool 10 computes a series of time delays at each substep 14, 15, 16, 17a, 17b, 18 and outputs the time required to complete the project based upon the requirements and available resources, and the simulation ends 19. In the event that it is determined that there are not enough resources available to complete the project at a particular substep 14, 15, 16, 17a, 17b, 18, the simulation stops at the appropriate event 13a–13f until changes are made to the requirements, the resources, or the time allocated to perform the substeps 14, 15, 16, 17a, 17b, 18 that permits complete calculation of the time duration of the project.

Changing various user-defined inputs produces changes in the calculated time duration of a project. The conventional tool 10 only passes a single time value from one substep 14, 15, 16, 17a, 17b, 18 (calculation) to the next. Furthermore, the conventional tool 10 does not pass variables from one process substep 14, 15, 16, 17a, 17b, 18.

Figure 2:
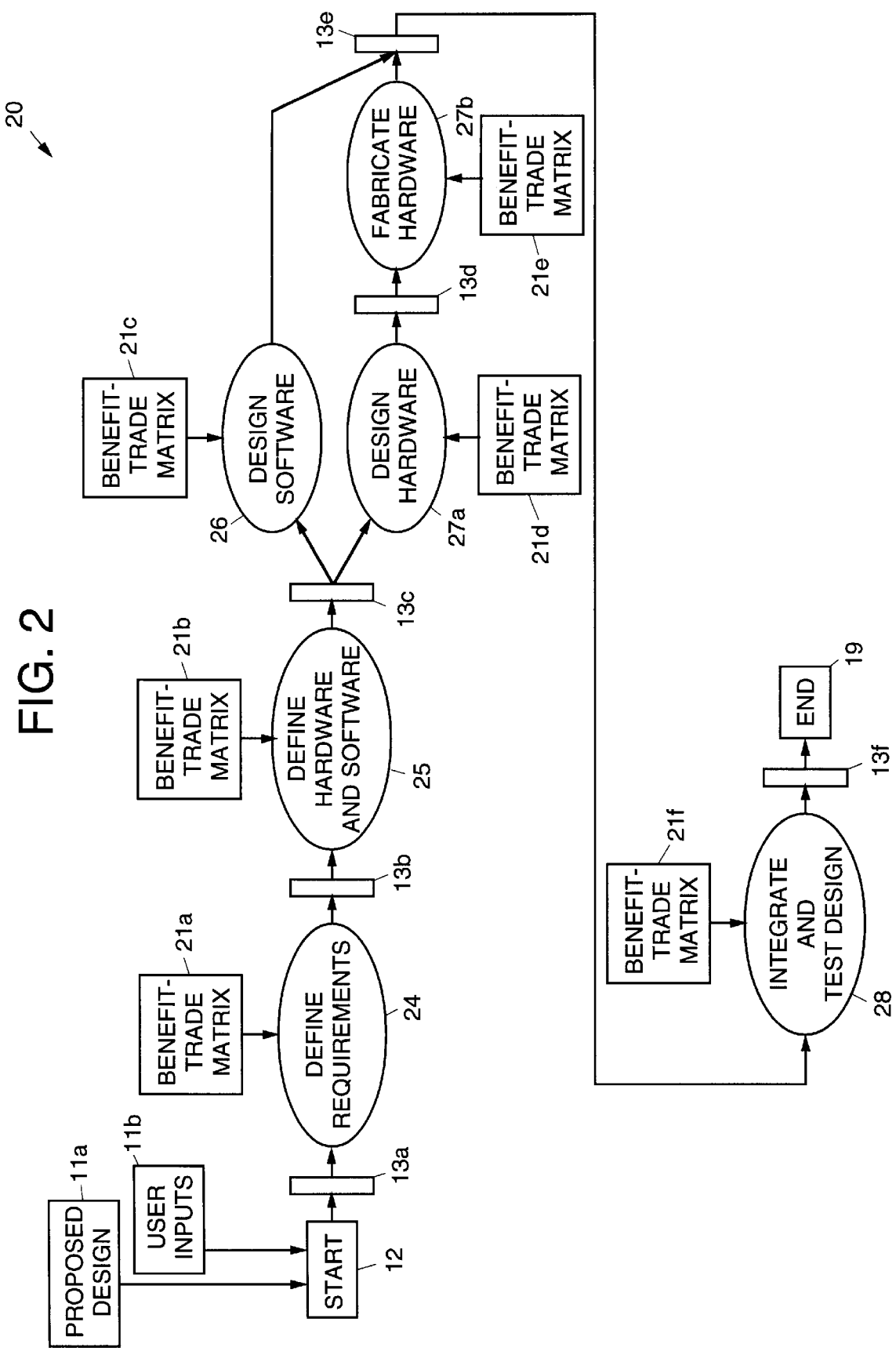
FIG. 2 is a process flow diagram illustrating a process simulation tool in accordance with the principles of the present invention.

Referring now to FIG. 2, it is a process flow diagram illustrating a process simulation tool 20 in accordance with the principles of the present invention. The process simulation tool 20 is shown as simulating substantially similar to the tool 10 described with reference to FIG. 1. However, in the present process simulation tool 20, each of the substeps 14, 15, 16, 17a, 17b, 18 of the prior art simulation tool 10 have been modified in accordance with the principles of the present invention such that each respective substep 24, 25, 26, 27a, 27b, 28 is defined by a corresponding logical equation. Furthermore, each of the substeps 24, 25, 26, 27a, 27b, 28 is linked to a benefit-trade matrix 21a–21f that embodies history data relating to the substep 24, 25, 26, 27a, 27b, 28. The logical equation computes the time required to complete the project, required resources for the project, and cost of the project based upon data input thereto from the linked benefit-trade matrix 21a–21f and a proposed or sample design 11a and the user inputs 11b which comprise design requirement priority values 11b.

A representative logical equation for use in the present invention is presented below, and may be defined as follows:

conditional expression used:

if virtual prototype level=current (specified) level, then [expr {(minimal time value (as derived from historical data))+(element #1 * time for element #1)+ . . . + (element #n * time for element #n)}, where the current level has a maximum of 8 and wherein n is an unlimited number of elements that are determined by the requirements, etc. The virtual prototype level is derived using the benefit-trade matrix. This is how cost, risk, schedule and other elements in the form of a vector are taken into account in this logical equation. User inputs are entered into the benefit-trade matrix and "values" are output therefrom that correspond to schedule, cost and risk elements, such as the number of components, number of buses, number of functions, error type, level of effort, tool availability, and resources that are available, for example. A global variable list is generated that includes the virtual prototype level and the values from the benefit-trade matrix, and the global variable list is by the present process simulation method 20 during processing.

More specifically, the present invention is an improved computer-implemented process simulation method 20 or tool 20 that uses a software engine that calculates resources required to complete a project based upon contents of user-defined benefit-trade matrices 21a–21f associated with substeps 24, 25, 26, 27a, 27b, 28 of the project and design requirement priority values 11b and the sample design 11a whose process is to be simulated. The present method 20 or tool 20 comprises the following steps, which is also illustrated in terms of a conventional flow chart in FIG. 3.

A plurality of design requirement priority values 11b and a sample design 11a having predefined elements are input 31 by a user, which design 11a has a process that is to be simulated. Each substep 24, 25, 26, 27a, 27b, 28 of the project is defined 32 using a predetermined benefit-trade matrix 21a–21f that comprises a multiple variable lookup table that embodies history data relating to the respective substep 24, 25, 26, 27a, 27b, 28 that includes relative weights of schedule, cost and risk elements for the substep 24, 25, 26, 27a, 27b, 28 and user-input rating data having values corresponding to the importance of each element. A logical equation is defined 33 for each substep 24, 25, 26, 27a, 27b, 28 that computes the time required to complete the project, required resources for the project, and cost of the project based upon data input thereto. The data is derived from the linked benefit-trade matrix 21a–21f, and the user inputs 11b which comprise design requirement priority values 11b and the sample design 11a.

Weights for schedule, cost and risk elements of each benefit-trade matrix are input 34 by the user. Rating values for schedule, cost and risk elements of each benefit-trade matrix 21a–21f are input 35 by the user. Output vectors for each benefit-trade matrix 21a–2f that comprise values corresponding to the respective weight of each element times the respective rating value of each element are computed 36. At each substep 24, 25, 26, 27a, 27b, 28, resources required to complete the project are calculated 37 using the vector derived from the benefit-trade matrices 21a–21f associated with the substep 24, 25, 26, 27a, 27b, 28, and the design requirement priority values 11b and predefined elements or vector derived from the benefit-trade matrix 21a–21f associated with a previous substep 24, 25, 26, 27a, 27b.

By way of example, each benefit-trade matrix 21a–21f may contain a number of elements or metrics derived from project and user requirements. Such elements may include level of effort, schedule, cost, risk, tool availability, error types found, signal widths, I/O cross wiring, missing wiring, bus protocol errors, bus contention errors, bus control errors, incorrect functionality, clock level timing errors, incorrect addressing, incorrect data, incorrect hardware/software interaction, bus errors, control errors, and incorrect algorithm. Each of the elements are then weighted and rated by the user, which data is entered into each benefit-trade matrix 21a–21f. A typical each benefit-trade matrix 21a–21f is illustrated in Table 1.

TABLE 1

| Metric | Weight | Rating | Score |
| --- | --- | --- | --- |
| Level of effort (labor) | 15 | 2 | 10 |
| Schedule | 5 | 10 | 50 |
| Tool availability | 100 | 10 | 1000 |
| Model availability | 100 | 10 | 1000 |
| Error types found | | | |
| Signal widths | 5 | 5 | 25 |
| I/O cross wiring | 5 | 5 | 25 |
| Missing wiring | 5 | 8 | 40 |
| Bus protocol errors | 5 | 5 | 25 |
| Bus contention errors | 5 | 5 | 25 |

TABLE 1-continued

| Metric | Weight | Rating | Score |
| --- | --- | --- | --- |
| Bus control errors | 5 | 5 | 25 |
| Incorrect functionaiity | 2 | 0 | 0 |
| Clock level timing errors | 5 | 0 | 0 |
| Incorrect addressing | 2 | 2 | 4 |
| Incorrect data | 2 | 1 | 2 |
| Incorrect H/W/S/W interaction | 1 | 0 | 0 |
| Incorrect algorithm | 1 | 0 | 0 |
| Total | | | 2231 |

The elements or metrics are converted into variables in the simulation tool 20 which are given values prior to simulation by the user. Simulation of the defined process begins and all variables are passed to each substep 24, 25, 26, 27a, 27b, 28. At the beginning of each substep 24, 25, 26, 27a, 27b, 28, the tool 20 reads in only those variables that are affected by that particular substep, 24, 25, 26, 27a, 27b, 28, and the rest of the variables are passed to the next substep 24, 25, 26, 27a, 27b, 28 unchanged.

At the end of simulation, an audit trail report from the tool 20 shows the outcome of each variable along with which substep 24, 25, 26, 27a, 27b, 28 that affected it. The reports generated by the tool 20 are provided as part of the Perceptronics tool 10 that was modified to produce the present tool 20. This information may be used quantitatively by the user to accurately assess the risk, cost, and schedule associated with the decisions made for the project. In addition, the tool 20 allows for scenario changes whereby the user can modify one or several variables contained in the benefit-trade matrices 21a–21f and re-simulate the process to analyze the resulting information.

In addition, the user can halt execution of the simulation at any time, modify any variable contained in the respective benefit-trade matrices 21a–21f, and continue with the simulation to see the affects of the change(s) on the remainder of tasks for the project. This is especially important because most schedules, or other variables, such as manpower and cost, for example, change over the lifetime of a project. At any point during the project, the process can be re-evaluated and re-simulated giving the user a clear understanding of the risks associated with making any change to the current process.

As an example, a user may want to determine to what level virtual prototyping is needed for a project. The purpose of virtual prototyping is to uncover both hardware and software problems as early as possible in a design cycle. This is accomplished in a cost effective manner by focusing the prototyping effort on those aspects of the system or project which, when simulated, provide the greatest reduction of risk for the level of effort expended. Each level of virtual prototyping has an associated cost, level of effort, time, and error detection (and correction) rate. Knowing that the time spent up front will save possible rework during hardware test (which includes level of effort and time needed for error correction), the user must determine at what point the cost exceeds the benefits within the risk associated with the project.

If a low virtual prototype level is chosen, then the simulation will run through the process using historical data to determine total project risk, cost, and schedule, as well as where each variable was impacted. The quantitative results may show the user that the minimal time spent up front and the resulting high schedule impact during the hardware testing phase far exceeds what is acceptable to the project.

If a higher virtual prototype level is chosen, then the simulation will run through the process to determine a new total program risk, cost, and schedule, and determine where each variable was impacted. This result may be satisfactory to the user because the time spent up front was actually time and cost saving during the hardware test phase of the project.

In real numbers, using historical data, if it is determined that a bus protocol error, for example, has a 50% detection rate and bus contention error has a 20% detection rate when simulated in software at the lower level but at a total cost of one-to-two one-person months. If the risk metric is scored high, then the user may decide to forgo simulation and take the risk that a mistake was not made, or, make the trade off that if a mistake is made, then it would be dealt with further down the line. If this design is made into hardware, there would still be a 50% probability of a bus protocol error and 80% for a bus contention error. If errors were detected, then, using historical data, it would take anywhere from 16 to 80 hours for each bus error and each bus contention error to diagnose and rectify the problem. Therefore it would make more sense to prototype to a higher level, which is described next.

In the higher virtual prototype level, bus protocol errors and bus contention errors have a 99% detection rate when simulated in software but at a cost of two-to-three one-person months. Detecting these errors up front virtually eliminates any correction in hardware. In this case, the benefit of time spent up front outweighs the risk of time spent later.

This example shows, through quantitative measures, that cost and schedule can accurately be measured with a clear assessment of risk. The present process simulation tool 10 permits the user to more accurately simulate the project so that more meaningful decisions can be made.

Thus, a process simulation technique or tool that uses benefit-trade matrices to dynamically predict schedule, cost and risk variables of a project has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A computer-implemented process simulation method having a software engine that calculates resources required to complete a project having a design whose process is to be simulated, said method comprising the steps of:

defining a project;

defining a plurality of physical resources that are required to complete the project;

inputting a plurality of design requirement priority values and a sample design having predefined elements into a computer, which sample design has a process that is to be simulated;

defining each substep of the project using a predetermined benefit-trade matrix that comprises a multiple variable lookup table that embodies history data relating to the substep that is indicative of weights of schedule, cost and risk elements for the substep and user-input rating data that comprises values corresponding to the importance of each respective element;

defining a logical equation for each substep that computes the time required to complete the project, required resources for the project, and cost of the project based upon data input thereto;

inputting weights for schedule, cost and risk elements of each benefit-trade matrix;

inputting rating values for schedule, cost and risk elements of each benefit-trade matrix;

computing output vectors for each benefit-trade matrix that comprise values corresponding to the respective weight of each element times the respective rating value of each element;

at each substep, calculating resources required to complete the project using the vector derived from the benefit-trade matrix associated with the substep, and the design requirement priority values and predefined elements or vector derived from the benefit-trade matrix associated with a previous substep; and outputting data for use in assessing the risk, cost, and schedule associated with decisions made regarding the project.

2. The method of claim 1 wherein the logical equation for each substep comprises an if-then-else function that links each benefit-trade matrix to an equation that is used to calculate resources required to complete the project.

* * * * *

UNITED STATES PATENT AND TRADEMARK OFFICE
CERTIFICATE OF CORRECTION

PATENT NO : 6,088,678
DATED : July 11, 2000
INVENTOR(S): Diane M. Shannon

It is certified that error appears in the above-identified patent and that said Letters Patent are hereby corrected as shown below:

At column 1, line 7, insert the following as the first paragraph after the heading BACKGROUND OF THE INVENTION:

--This invention was made with Government support under Contract Number N00014-93-C-2172 awarded by the U.S. Naval Research Laboratory. The Government has certain rights in this invention.--

Signed and Sealed this

Seventeenth Day of April, 2001

Attest:

NICHOLAS P. GODICI

Attesting Officer    Acting Director of the United States Patent and Trademark Office